US010350779B2

(12) United States Patent
Seager et al.

(10) Patent No.: US 10,350,779 B2
(45) Date of Patent: Jul. 16, 2019

(54) METHOD FOR CUTTING FOOD PRODUCTS INTO PORTIONS

(71) Applicant: THURNE-MIDDLEBY LTD., Norwich (GB)

(72) Inventors: Richard David Seager, Norfolk (GB); John Kelsey, Norfolk (GB)

(73) Assignee: THURNE-MIDDLEBY LTD., Norwich (GB)

( * ) Notice: Subject to any disclaimer, the term of this patent is extended or adjusted under 35 U.S.C. 154(b) by 235 days.

(21) Appl. No.: 14/939,461

(22) Filed: Nov. 12, 2015

(65) Prior Publication Data

US 2016/0059431 A1 Mar. 3, 2016

Related U.S. Application Data

(63) Continuation of application No. 12/779,195, filed on May 13, 2010, now abandoned.

(30) Foreign Application Priority Data

May 15, 2009 (EP) .................................... 09160398

(51) Int. Cl.
*B26D 5/00* (2006.01)
*B26D 7/00* (2006.01)
(Continued)

(52) U.S. Cl.
CPC ............... *B26D 5/007* (2013.01); *B26D 5/00* (2013.01); *B26D 7/00* (2013.01); *B26D 7/30* (2013.01);
(Continued)

(58) Field of Classification Search
CPC . B26D 5/00; B26D 5/007; B26D 7/00; B26D 7/30; B26D 7/32; Y10T 83/04; Y10T 83/145
(Continued)

(56) References Cited

U.S. PATENT DOCUMENTS 3,204,676 A * 9/1965 Gillman .................. B26D 7/30 83/717
3,846,957 A * 11/1974 Divan ...................... B26D 5/00 177/120

(Continued)

FOREIGN PATENT DOCUMENTS

DE 4410596 A1 10/1995
EP 0449512 A1 10/1991
WO WO-2007/148041 A1 12/2007

OTHER PUBLICATIONS

European Search Report for corresponding European patent application No. EP09160398 (dated Oct. 23, 2009).

*Primary Examiner* — Ibrahime A Abraham
*Assistant Examiner* — Frederick F Calvetti
(74) *Attorney, Agent, or Firm* — Marshall, Gerstein & Borun LLP

(57) ABSTRACT

A new method for dividing a food product log into separate portions prior to cooking of the portions uses a machine that cuts portions from an end of the product log, a controller that controls the operation of the cutting machine, and a sensing arrangement that generates a signal dependent on a cross-sectional dimension of the product at the end. The controller determines the thickness of the next portion to be cut from the end by the cutting machine using the signal from the sensing arrangement and the value of a cook-out parameter related to the proportion of the end of the product that is formed by at least one constituent of the product. The thickness is calculated with a view to the portion achieving a predetermined target weight after it has been cooked.

14 Claims, 2 Drawing Sheets

(51) Int. Cl.
*B26D 7/30* (2006.01)
*B26D 7/32* (2006.01)

(52) U.S. Cl.
CPC ................. *B26D 7/32* (2013.01); *Y10T 83/04* (2015.04); *Y10T 83/145* (2015.04)

(58) Field of Classification Search
USPC .................. 99/537, 546, 567, 635, 636, 637
See application file for complete search history.

(56) References Cited

U.S. PATENT DOCUMENTS 4,055,677 A * 10/1977 White .................... A47J 37/04 126/41 R
4,065,911 A * 1/1978 Fagan ..................... B26D 7/30 177/121
4,136,504 A * 1/1979 Wyslotsky ............... B26D 7/30 177/50
4,548,108 A * 10/1985 Dennis .................... B26D 5/32 83/13
5,109,936 A * 5/1992 Ruppel .................... B26D 7/28 177/25.19
5,117,717 A * 6/1992 Mally ...................... B26D 5/20 53/157
5,410,954 A * 5/1995 Wygal ...................... B26D 3/22 83/404
5,481,466 A * 1/1996 Carey .................. A22C 17/002 700/167
5,937,080 A * 8/1999 Vogeley, Jr. ........... A22B 5/007 382/110
5,997,925 A * 12/1999 Wilson ................... A23B 4/023 426/332
6,045,841 A * 4/2000 Singh ...................... A23L 13/06 426/243
6,164,174 A * 12/2000 Sigurdsson ............ A22C 25/18 83/13
6,277,019 B1 * 8/2001 Veldkamp .......... G01N 21/8507 452/127
6,882,434 B1 * 4/2005 Sandberg ........... A22C 17/0033 250/223 R
7,008,657 B2 * 3/2006 Falk ........................ A23L 13/00 426/233
7,251,537 B1 * 7/2007 Blaine ................ A22C 17/0086 452/156
7,270,051 B2 * 9/2007 Hayashi ................... A21C 3/02 83/73
7,373,217 B2 * 5/2008 Young ................ A22C 17/0033 700/127
7,450,247 B2 * 11/2008 Sandberg ........... A22C 17/0033 250/223 R
7,452,266 B2 * 11/2008 Bottemiller ............. A22C 7/00 452/150
7,593,785 B2 * 9/2009 Blaine ................ A22C 17/0086 700/103
7,621,806 B2 * 11/2009 Bottemiller .......... A22C 17/008 452/150
7,841,264 B2 * 11/2010 Kim ......................... B26D 3/10 452/156
7,976,368 B2 * 7/2011 Haucke ................ A22C 17/008 452/184
8,025,000 B2 * 9/2011 Kim ......................... B26D 3/10 452/156
8,166,856 B2 * 5/2012 Kim ......................... B26D 3/10 452/156
8,373,749 B2 * 2/2013 Burton ..................... B26D 7/30 348/89
2003/0145699 A1 * 8/2003 Kim ......................... B26D 3/10 83/13
2004/0086610 A1 * 5/2004 Allan Falk .............. A23L 13/00 426/243
2004/0154445 A1 * 8/2004 Ozery ...................... B26D 5/34 83/39
2005/0154490 A1 * 7/2005 Blaine ................ A22C 17/0086 700/186
2005/0170056 A1 * 8/2005 Weber ...................... B26D 7/30 426/518
2005/0249632 A1 * 11/2005 Garrett ................... A22C 18/00 422/32
2006/0156878 A1 * 7/2006 Faires ...................... A22C 7/00 83/13
2006/0157388 A1 * 7/2006 Blaine ...................... A22C 7/00 209/3.2
2006/0171581 A1 * 8/2006 Blaine ...................... A22C 7/00 382/141
2007/0157776 A1 * 7/2007 Sorensen ............. A22C 17/002 83/23
2007/0204735 A1 * 9/2007 Kim ......................... B26D 3/10 83/360
2008/0212842 A1 * 9/2008 Burton ................... B26D 5/007 382/110
2008/0250904 A1 * 10/2008 Seager ..................... B26D 7/30 83/14
2008/0250907 A1 * 10/2008 Seager ............... A22C 17/0033 83/73
2008/0250945 A1 * 10/2008 Seager ................... B26D 5/007 99/537
2008/0281461 A1 * 11/2008 Blaine ...................... B26D 3/10 700/171
2009/0181138 A1 * 7/2009 Howard .................... A23L 5/13 426/233
2010/0066824 A1 * 3/2010 Burton ..................... B26D 7/30 348/89
2010/0288093 A1 * 11/2010 Seager ..................... B26D 5/00 83/13
2012/0040062 A1 * 2/2012 Srsen ....................... A21B 2/00 426/243
2013/0105470 A1 * 5/2013 De Luca ................... F24H 7/00 219/679
2015/0230483 A1 * 8/2015 Fritz ........................ A23B 4/01 426/232

* cited by examiner

METHOD FOR CUTTING FOOD PRODUCTS INTO PORTIONS

CROSS-REFERENCE TO RELATED APPLICATIONS

This is a continuation of application Ser. No. 12/779,195, filed May 13, 2010.

BACKGROUND OF THE INVENTION

The present invention relates to apparatus and methods for division of food products into separate portions prior to cooking thereof.

Food products are often divided into portions and the portions then grouped together and packaged for sale to consumers. For example, bacon is usually cut into slices. In some cases these portions are cooked by the food processor prior to packing.

The food product is typically cut into individual portions of a given thickness by a cutting machine. The fat in a food product liquefies during the cooking process and so a portion having a higher fat content will experience a greater weight reduction during cooking than a portion of the same initial volume but a lower fat content. Accordingly, to ensure that cooked portions are not under-weight, the cutting thickness needs to be set so as to ensure that those portions having the highest fat content still meet a minimum weight threshold after cooking. However, slices having a high lean content will exceed this minimum threshold to a significant extent, resulting in substantial "give-away" of product, that is, an excess of product in packs specifying a fixed minimum weight.

The food product to be divided up by a cutting machine is usually presented in the form of an elongated food product log. The product itself may be in a naturally-occurring form, such as a side or belly of pork or beef. These natural products have discrete areas of lean and fat, and possibly bone or other constituent tissue types.

Alternatively, products may be in a reconstituted form and comprise for example, chicken pieces packed together in a log or minced beef and so on. This relatively homogeneous material is then formed into a product log for slicing. Unlike a natural product, reconstituted products do not comprise discrete areas of material, because the constituents are inter-mingled.

BRIEF SUMMARY

The present invention provides processing apparatus for use in the division of a food product log into separate portions prior to cooking of the portions, the apparatus including:

a machine for cutting portions from an end of the product log;

a controller for controlling the operation of the cutting machine; and a sensing arrangement for generating a signal dependent on a cross-sectional dimension of the product at the end, wherein the controller is arranged to determine the thickness of the next portion to be cut from the end by the cutting machine with reference to said signal and to the value of a cook-out parameter related to the proportion of the end of the product which is formed by at least one constituent of the product, with a view to the portion achieving a predetermined target weight after it has been cooked.

Accordingly, by reference to the cook-out parameter, the portion thickness can be adjusted such that the weight of the portion after cooking is at or close to the desired weight.

Apparatus of the invention may also improve the uniformity of cooking of food portions. A slice with a greater fat content will differ in its crispness after cooking from a slice of the same dimensions having a higher lean content. In accordance with the invention, the apparatus may cut a product region having a higher fat content into thicker portions which will then be cooked to a similar extent as thinner, leaner slices.

The portion thickness calculations carried out by the controller therefore take into account the cross-section of the end of the product log and the value of the cook-out parameter. The cook-out parameter value is related to the proportion of the end of the product attributable to one or more, or at least two different constituents, such as fat, lean, bone and water, for example.

Different constituents may change weight to different extents during cooking, and the cook-out parameter value serves to adjust the portion size having regard to the proportion of the end of the product formed of a particular constituent (or the respective proportions associated with a number of constituents).

The sensing arrangement may generate a signal which is indicative of a cross-sectional dimension of the product at the end from which the next portion is to be cut. For example, where a reconstituted product is to be sliced and its width and cross-sectional shape are substantially constant, sensing of its height may be sufficient to enable the controller to control the slice thickness sufficiently accurately. Preferably, this signal generated by the sensing arrangement comprises an area signal which is indicative of the area of the end face.

In further embodiments, the cutting machine is arranged to cut a plurality of separate products into portions simultaneously giving a higher throughput rate. Preferably, each product is cut by a respective cutter, with the plurality of cutters operable in parallel.

The cutting machine may feed lines of food portions cut from respective food products along corresponding output lanes feeding into a common cooker. In some cases, the output from one or more lanes may be merged together to form a single lane. Alternatively, food portions cut from one food product may be fed into two or more output lanes feeding into a cooker.

The controller may be operable to vary the rate at which portions from each of a plurality of products are outputted by the cutting machine independently of the rates for other products being cut into portions at the same time. The rate of product portion throughput through an oven may affect the cooking of each individual portion and so control of this rate (by adjusting the cutting rate and/or conveying speed through the oven) may be employed to improve the cooking performance.

The controller may be arranged to take into account variation in the cooking performance associated with different lanes through a cooker in calculating the thickness of the next portion to be cut from the or each product log, by adjustment of the or each respective cook-out parameter value.

When multiple lanes pass through a cooker, there may be some variation in the overall cooking intensity for each lane. For example, the cooker may be a microwave oven in which the cooking intensity varies between the centre and sides of the oven interior. The controller may apply a different cook-out parameter in relation to each output lane of the cutting machine having regard to this variation.

In some embodiments, the or each cook-out parameter value employed by the controller is adjustable in response to user input. For example, an operator may inspect cooked portions emerging from the cooker, determine how close they are to the desired target weight and cook quality, and adjust the cook-out parameter (or the respective cook-out parameters for a plurality of lanes) so that the cooked portions are closer to the desired characteristics.

The sensing arrangement of the processing apparatus may comprise a detector operable to generate a content signal which is dependent on the proportion of the end of the product (from which the next portion is to be cut) that is formed by at least one constituent of the product. The detector may be responsive to the amount of other constituents in the end, and include corresponding signals in the content signal output. The controller is arranged to determine the value of the respective cook-out parameter with reference to the content signal. The same detector may in some cases be employed to also generate the signal dependent on a cross-sectional dimension of the end face of the product. The content signal may represent a lean-to-fat ratio, for example. It may indicate the proportion(s) of the end face which is/are formed of fat, lean, bone and/or water, for example.

The controller may be arranged to receive an input signal related to the proportion of the end of the product which is formed by a constituent of a product (or a plurality of signals related to the respective proportions associated with a number of constituents). It may then employ an algorithm to determine a cook-out parameter value based on the input signal(s). The cook-out parameter value is then used in the portion thickness calculations carried out by the controller.

The controller may be arranged to receive a feedback signal from a weighing device downstream of the cooker, and adjust its portion thickness calculations with reference to the feedback signal, so as to minimize deviation from the predetermined target weight for cooked portions. Where multiple lanes pass through the cooker, the cooked portions may be fed to a common weighing device. Alternatively, a weighing device may be provided in relation to each lane. The use of electronic feedback from a weighing device reduces the need for operator involvement in the weight monitoring procedure.

The controller may be operable to generate an output signal for transmission to a cooker downstream of the cutting machine, which signal relates to at least one performance characteristic of the cooker and/or at least one characteristic of a product to be sliced or being sliced, to adjust the operation of the cooker. This functionality provides a greater degree of control over the cooking process and the characteristics of the cooked portions.

The signal outputted from the controller to the cooker may then influence the cooker's performance. More particularly, it could concern the oven conveyor belt speed, oven power, and/or microwave oven waveguide positions, for example.

This may be particularly beneficial when handling inconsistently shaped natural products. This variation may lead to some portions being over or under-cooked. It can be addressed at extra cost by pressing the product into a consistent shape, and/or trimming the product prior to slicing. This results in undesirable give-away of the product. Instead, the controller may send an output signal to a cooker, having regard for example the dimensions and lean-to-fat ratio of a portion, which is then employed to adjust the cooker's performance and thus produce a more consistently cooked product.

The controller may store data relating to the performance of a cooker associated with the processing apparatus, such as the cooker power, and calculate the expected change in the weight of a portion during cooking having regard to this information. In some embodiments, the controller may be arranged to receive a cooker input signal from a cooker downstream of the cutting machine, which signal relates to at least one performance characteristic of the cooker, and the controller is then operable to adjust the or each cook-out parameter value with reference to the cooker input signal.

For example, the at least one performance characteristic may be selected from: the speed of the conveyor carrying the food portions through the cooker; the power of the cooker; differences in the cooker performance with respect to different lanes through the cooker; and the positions of microwave waveguides in the cooker.

The sensing arrangement may comprise at least one of: a visible and/or non-visible light detection arrangement; an x-ray analysis arrangement; an MRI arrangement; and an ultrasound analysis arrangement. The sensing arrangement may be responsive to the properties of the end portion or end face of the product from which slices are being cut during the slicing process. Thus the controller may be operable to adjust the slice thickness during slicing in response to properties detected at the end of the product as the slicer progresses through the product.

A light detection arrangement may be configured to acquire an image of the end face from which the next portion is to be cut. This image data may then be processed to determine the cross-sectional area of the end face and provide a measure of the area of one or more constituent parts visible in the end face.

An x-ray analysis arrangement may be employed to detect discrete regions of one or more constituents in a product log. It may also detect the cross-sectional area at the end of the product. In further embodiments, an x-ray analysis arrangement may scan a substantial proportion or the whole of a food product log prior to cutting to assess the content throughout and the variation in the cross-sectional area along the scanned length of the product.

The analysis described above in relation to an x-ray system may be carried out using alternative techniques such as MRI or ultrasound analysis, for example. When using such sensing techniques which are able to analyse the internal composition of a food product, it will be appreciated that the content of an end region of the product may be analysed and used to calculate a cook-out parameter value, in contrast to an arrangement detecting visible light, which is responsive to the constituent(s) visible in the end face itself.

The cutting machine may be a slicing machine for cutting slices from the end face of a food product, for example. The present apparatus may be used by a food processor to slice logs of belly bacon in the production of packs of pre-cooked bacon slices of a given weight.

The present invention further provides a method of controlling processing apparatus to divide a food product log into separate portions prior to cooking of the portions, the apparatus including a machine for cutting portions from an end of the product log, a controller for controlling the operation of the cutting machine, and a sensing arrangement, wherein the method comprises the steps of:

outputting a signal from the sensing arrangement to the controller dependent on a cross-sectional dimension of the product at the end; and determining with the controller the thickness of the next portion to be cut from the end by the cutting machine with reference to said signal and to the value of a cook-out parameter related to the proportion of the end of the product which is formed by at least one constituent of the product, with a view to the portion achieving a predetermined target weight after it has been cooked.

BRIEF DESCRIPTION OF THE DRAWINGS

An embodiment of the invention will now be described with reference to the accompanying schematic drawings, wherein.

DETAILED DESCRIPTION

Figure 1:
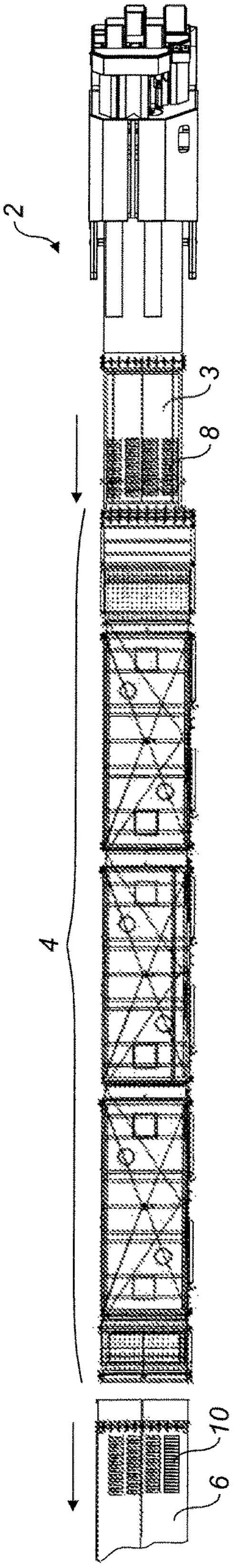
FIG. 1 is a plan view of a food processing system comprising processing apparatus embodying the invention in combination with a microwave oven.
Figure 2:
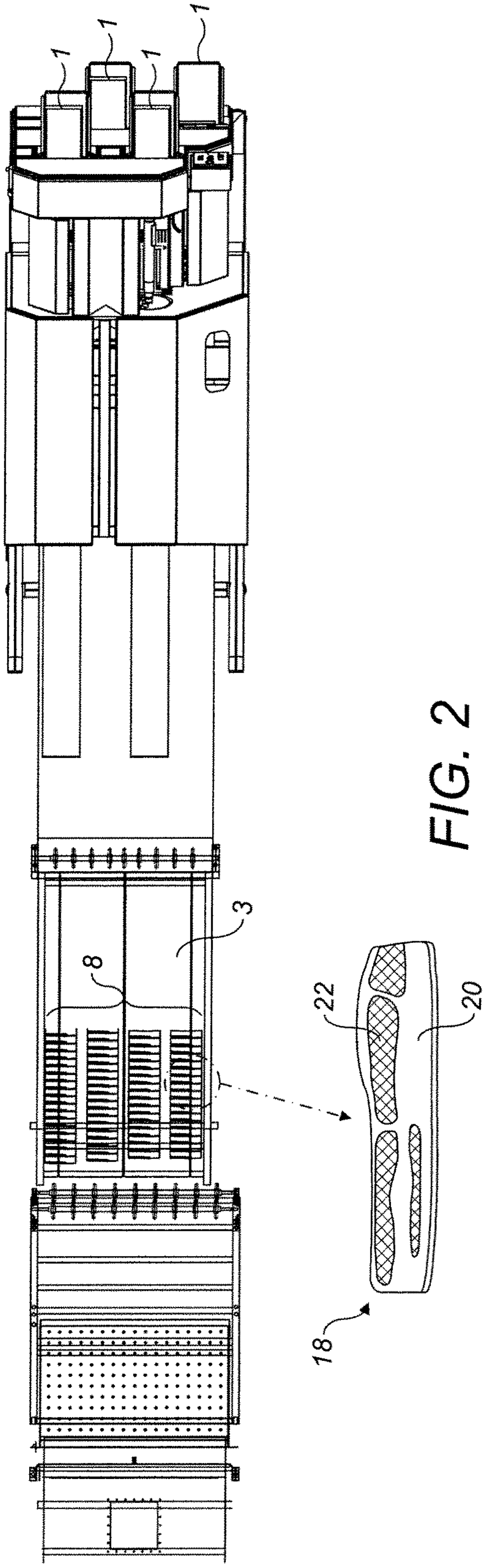
FIG. 2 is an enlarged view of part of FIG. 1.
Figure 3:
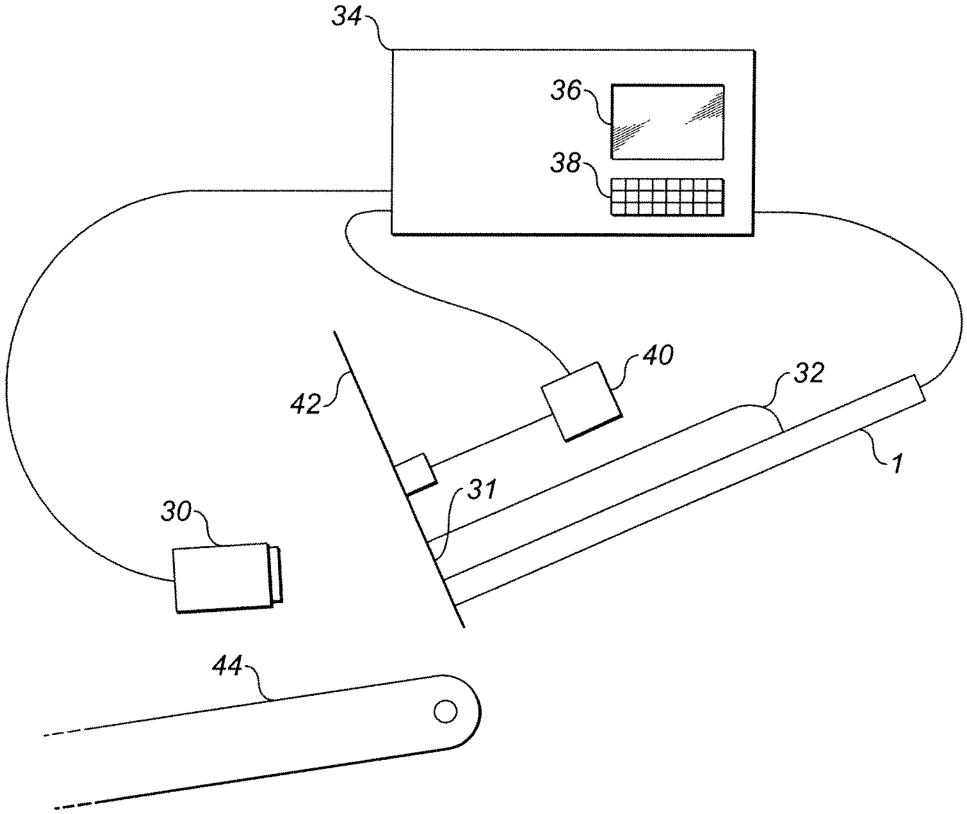
FIG. 3 is a side view of some components of the slicing machine of FIGS. 1 and 2.

The system of FIGS. 1 to 3 includes a slicing machine 2 which is arranged to slice up to four logs of food product simultaneously. The logs are loaded onto four infeed beds 1. The slices are fed along a conveyor 3 in four parallel output lanes towards a microwave oven 4. The cooked food product then emerges from the downstream end of the oven and is carried along a conveyor 6 towards a packaging station (not shown).

By way of illustration four parallel streams 8 of raw bacon slices are shown partially in FIGS. 1 and 2 which are being fed into the oven. Four parallel streams 10 of cooked bacon slices are shown beyond the downstream end of the oven in FIG. 1. FIG. 2 includes a representation of an individual bacon slice 18 having substantial fat content 20, and lean content 22.

FIG. 3 shows some components of the slicing machine 2 depicted in FIGS. 1 and 2 including one of the four product infeed beds 1. A sensing arrangement 30 is able to generate a signal dependent on the area of the end face 31 of a log 32 of food product loaded into the slicing machine 2. These signals are fed into a controller 34, in the form of a programmed computer, for example, which determines the thickness of the next portion to be cut from the end face with reference to this signal and a stored cook-out parameter value, such that the portion has a predefined target weight after it has been cooked.

The cook-out parameter value may be adjustable by a user by means of a display 36 and keypad 38 of the controller 34.

The sensing arrangement 30 is also able to detect the proportion (or respective proportions) of the end of the product 32 attributable to one or more constituent parts of the product and the controller 34 calculates the cook-out parameter value having regard to this information.

When a food product includes discrete areas of different constituents, such as lean meat and fat, the sensing arrangement is operable to provide information in its output signal related to the size of one or more of these discrete areas. As noted above, this may be achieved by detection of visible and/or non-visible light emanating from the end face, or by other forms of detection. If different constituents are mixed together in the product to be sliced, the sensing arrangement may detect the proportion of the end of the product formed by one or more of these constituents.

A motor 40 is provided to rotate a blade 42. The blade may be selected from the range of known types, such as involute, planetary rotating circular, and sickle knives, for example. When a slice is cut from the end face of the product, it falls onto an output conveyor 44. The product is moved towards the blade via a motor driven track in the infeed bed 1. Alternatively, it may be urged towards the blade by a pusher or gripper which engages the end of the product opposite to the blade. The blade is rotated and the product moved past the blade under the control of controller 34 to cut each slice with a thickness calculated in the controller.

Where the slicing machine includes multiple infeed beds, it will be appreciated that the arrangement shown in FIG. 3 will be replicated for each bed, with the controller 34 controlling each bed arrangement independently of the others.

The invention claimed is:

1. A method of controlling processing apparatus to divide a food product log into separate portions and cook the portions, the apparatus including a sensing arrangement, a cutting machine for cutting portions from an end of the product log, a cooker downstream of the cutting machine, and a weighing device downstream of the cooker, wherein the method comprises:

storing in a controller a cook-out parameter that is a factor indicating the extent to which a cut portion will change weight during cooking;

using the cutting machine to cut portions from the end of the product log under the control of the controller, the cuts creating new exposed ends of the product log;

using the sensing arrangement to sense the fat content exposed at the new exposed ends of the product log; and output a fat content signal to the controller that is dependent on the sensed fat content;

cooking the cut portions with the cooker;

using the weighing device to weigh cooked portions and send a weight feedback signal to the controller;

changing the cook-out parameter as the cutting progresses and the new exposed ends of the product log are created, in response to the fat content signal and the weight feedback signal; and changing the slice thickness with reference to the cook-out parameter as the cutting progresses and the new exposed ends of the product log are created.

2. The method of claim 1, wherein the signal generated by the sensing arrangement comprises an area signal dependent on the cross-sectional area of the end.

3. The method of claim 1, wherein the cutting machine cuts a plurality of food product logs into portions simultaneously.

4. The method of claim 3, wherein the cutting machine has a plurality of output lanes which convey corresponding lines of portions cut from respective food product logs.

5. The method of claim 4, wherein the controller varies the rate at which portions from each of the plurality of product logs are outputted by the cutting machine independently of the rates for the other product logs.

6. The method of claim 1, wherein the controller takes into account variation in the cooking performance associated with different lanes through a cooker downstream of the cutting machine in calculating the thickness of the next portion to be cut by adjustment of respective cook-out parameter values.

7. The method of claim 1, including the step of adjusting the or each cook-out parameter value in response to user input.

8. The method of claim 1, wherein the sensing arrangement comprises a detector operable to generate a content signal dependent on the proportion of the end of the product log which is formed by at least one constituent of the product log, and the controller determines the value of the respective cook-out parameter with reference to the content signal.

9. The method of claim 1, wherein the controller generates an output signal for transmission to a cooker downstream of the cutting machine, which signal relates to at least one performance characteristic of the cooker and/or at least one characteristic of a product log to be sliced or being sliced, to adjust the operation of the cooker.

10. The method of claim 1, wherein the controller receives a cooker input signal from a cooker downstream of the cutting machine, which signal relates to at least one performance characteristic of the cooker, and the controller adjusts the or each cook-out parameter value with reference to the cooker input signal.

11. The method of claim 9, wherein the at least one performance characteristic of the cooker is selected from: the speed of the conveyor carrying the food portions through the cooker; the power of the cooker; differences in the cooker performance with respect to different lanes through the cooker; and the positions of microwave waveguides in the cooker.

12. The method of claim 10, wherein the at least one performance characteristic of the cooker is selected from: the speed of the conveyor carrying the food portions through the cooker; the power of the cooker; differences in the cooker performance with respect to different lanes through the cooker; and the positions of microwave waveguides in the cooker.

13. The method of claim 1, wherein the sensing arrangement comprises at least one of: a light detection arrangement; an x-ray analysis arrangement; an MRI arrangement; and an ultrasound analysis arrangement.

14. The method of claim 1, wherein the cutting machine is a slicing machine for cutting slices from the end face of a product log.

* * * * *